(12) United States Patent
Hachtel (10) Patent No.: US 6,389,349 B1
(45) Date of Patent: May 14, 2002

(54) METHOD AND APPARATUS FOR ACTIVATING A PUMP OF A BRAKING SYSTEM AS A FUNCTION OF THE PRESSURE GRADIENT

(75) Inventor: Juergen Hachtel, Moeckmuehl (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/340,334

(22) Filed: Jun. 25, 1999

(Under 37 CFR 1.47)

(51) Int. Cl.⁷ .............................. B60T 8/88; B60J 8/32
(52) U.S. Cl. .................. 701/70; 303/11; 303/113.4; 303/116.1; 303/122.09; 303/92; 303/115; 303/65
(58) Field of Search ................ 701/70, 79, 78, 701/83; 303/10, 11, 116

(56) References Cited

U.S. PATENT DOCUMENTS

| | | | | |
|---|---|---|---|---|
| 4,357,054 A | * | 11/1982 | Leiber | 303/10 |
| 4,699,435 A | * | 10/1987 | Wupper | 303/11 |
| 4,880,282 A | * | 11/1989 | Makino et al. | 303/116 |
| 5,197,787 A | * | 3/1993 | Matsuda et al. | 303/10 |
| 5,791,745 A | * | 8/1998 | Sakakibara | 303/11 |
| 6,132,012 A | * | 10/2000 | Ishii | 303/122.12 |

* cited by examiner

*Primary Examiner*—William A. Cuchlinski, Jr.
*Assistant Examiner*—Tuan C To
(74) *Attorney, Agent, or Firm*—Kenyon & Kenyon (57) ABSTRACT

An activation signal of a pump of a braking system is created as a function of a pressure gradient, preferably from a pressure accumulator. In this context, the switched-on time of a pulse-width modulated signal within an activation clock cycle is varied, taking into consideration the accumulator pressure gradient, in order to activate the pump. This is done by addressing a switching arrangement by way of a control unit. Activation as a function of the pressure gradient can be accomplished alternatively to or in combination with activation as a function of the generator voltage of the pump motor.

10 Claims, 6 Drawing Sheets

METHOD AND APPARATUS FOR ACTIVATING A PUMP OF A BRAKING SYSTEM AS A FUNCTION OF THE PRESSURE GRADIENT

FIELD OF THE INVENTION

The present invention relates to a method and apparatus for controlling an arrangement for delivering a pressure medium, in particular a pump, of a braking system.

BACKGROUND INFORMATION

German Published Patent Application No. 195 48 248 describes a method and an apparatus for controlling a pump of an electrohydraulic braking system. In this, the hydraulic fluid is injected from a pressure accumulator through valves into the wheel brake cylinder, the pressure accumulator being charged by a pump. In order to make charging of the pressure accumulator as noiseless as possible, the pump is activated with a demand-based pulse/interpulse ratio of a PWM signal, depending on the required volume of hydraulic fluid and a pressure in the pressure accumulator. The PWM signal is modified, as a function of a definable pressure value, with the deviation of the actual pressure from that value (pressure accumulator hysteresis). In this context, a plurality of fixed pressure threshold values are used for activation at appropriate delivery capacity. This Unexamined Application specifically describes the activation of a pump in an electrohydraulic braking system. A braking system comparable thereto is also described in SAE Paper 960991.

Also known are methods and apparatuses in which the return flow pumps in hydraulic braking systems are activated as a function of the generator voltage generated by the pump motor at zero load. Comparable hydraulic braking systems are known, for example, from the offprint of ATZ 95 (1993) Vol. 11, or from German Published Patent Application No. 195 46 682. German Published Patent Application No. 42 32 130 describes, for this purpose, a method and an apparatus for controlling an electric motor-driven hydraulic pump that generates auxiliary pressure for a braking system having an antilock braking control system and/or a drive slip control system. For that purpose, it is equipped with a variable activation clock cycle made up of a pulse/interpulse sequence. The voltage induced in generator fashion by the pump motor during the interpulses (referred to simply as the "generator voltage") is analyzed as an indication of the pump rotation speed. By differentiating this generator voltage (as the rotation speed actual value) with a reference variable for the pump motor rotation speed created in an antilock braking or drive slip control system, a difference variable is then made available to a downstream controller. The output signal of the controller is used to create the pulse-width modulated adjusting signal for pump activation. The drive motor of the hydraulic pump is switched on and off in time with this pulse-width modulated adjusting signal.

It has been found that the known method and the corresponding apparatuses are not capable of yielding optimum results in every respect. It is found, for example, at low temperature or in the presence of other disturbances, that the delivery capacity of the pump in clock-timed operation, regulated by the generator voltage, is not sufficient. In addition, there is no guarantee with the known methods that a desired pressure level will be reached within a time that is definable as a function of the situation. This applies equally to pressure rise and pressure drop. For example, the need to deliver the pressure medium more quickly or more slowly out of an accumulator in the braking system in order to take into account a desired pressure drop, not only in the wheel brake cylinders but also in the rest of the braking system, is insufficiently met. Similarly, pressure medium is not conveyed into the entire braking system and/or into a pressure accumulator with an exact time stipulation, i.e. in terms of achieving a specific pressure level within a particular time period.

SUMMARY OF THE INVENTION

The activation signal of the arrangement for delivering the pressure medium, and/or its creation, especially in the case of a PWM signal, is dependent on at least one condition. One condition for creating an activation signal for activating the arrangement for delivering the pressure medium, in particular the pump, of a braking system, is constituted, according to the present invention, at least as a function of a pressure gradient variable.

This pressure gradient variable represents an actual value of a pressure gradient of the pressure medium in the braking system. The condition for creation of the activation signal is referred to as the "dependency mode," and is configured, for example, as a comparison of the pressure gradient variable to various pressure gradient threshold values, and/or as an analysis of a characteristics diagram with the pressure gradient variable as one characteristics diagram variable, and/or as a stipulation of the pressure gradient variable as a command variable in a control loop.

In addition, as a further dependency mode, it is also possible to ascertain on the basis of a definable activation signal having a definable switched-on duration within an activation clock cycle, by simple further calculation—for example by addition or subtraction of time steps to or from the switched-on duration, by multiplication or division, or by other operations—an adapted activation signal based on the original one and following therefrom, from which a new pressure gradient variable then results.

The condition used hitherto for activating a pump of a braking system (the dependency of the activation signal on the generator voltage) can now also be advantageously replaced and/or supplemented, in situations in which the previous method does not always yield optimum results, by a further condition: the dependency of the activation signal on a pressure gradient.

The method according to the present invention thus has the advantage that in its context, the pulse/interpulse ratio of the activation signal or the switched-on time of the pump is modified within one activation clock cycle, for example, in such a way that the pressure in the accumulator at least reaches a predefinable pressure change. This applies equally to a pressure rise and a pressure drop. This ensures that a desired pressure level is also achieved within a predefinable time. On the one hand it is thereby possible to achieve a minimum pressure rise or a minimum pressure drop in the pressure medium as well as a maximum pressure rise or maximum pressure drop, i.e. a maximum pressure gradient; and on the other hand, an exact time stipulation for reaching a specific pressure is ensured.

In addition, the delivery capacity and the rate of the pressure rise or pressure drop can be set by using different pressure gradient values used as threshold values, and, associated with them, predefinable switched-on durations within an activation clock cycle.

DETAILED DESCRIPTION

Figure 1:
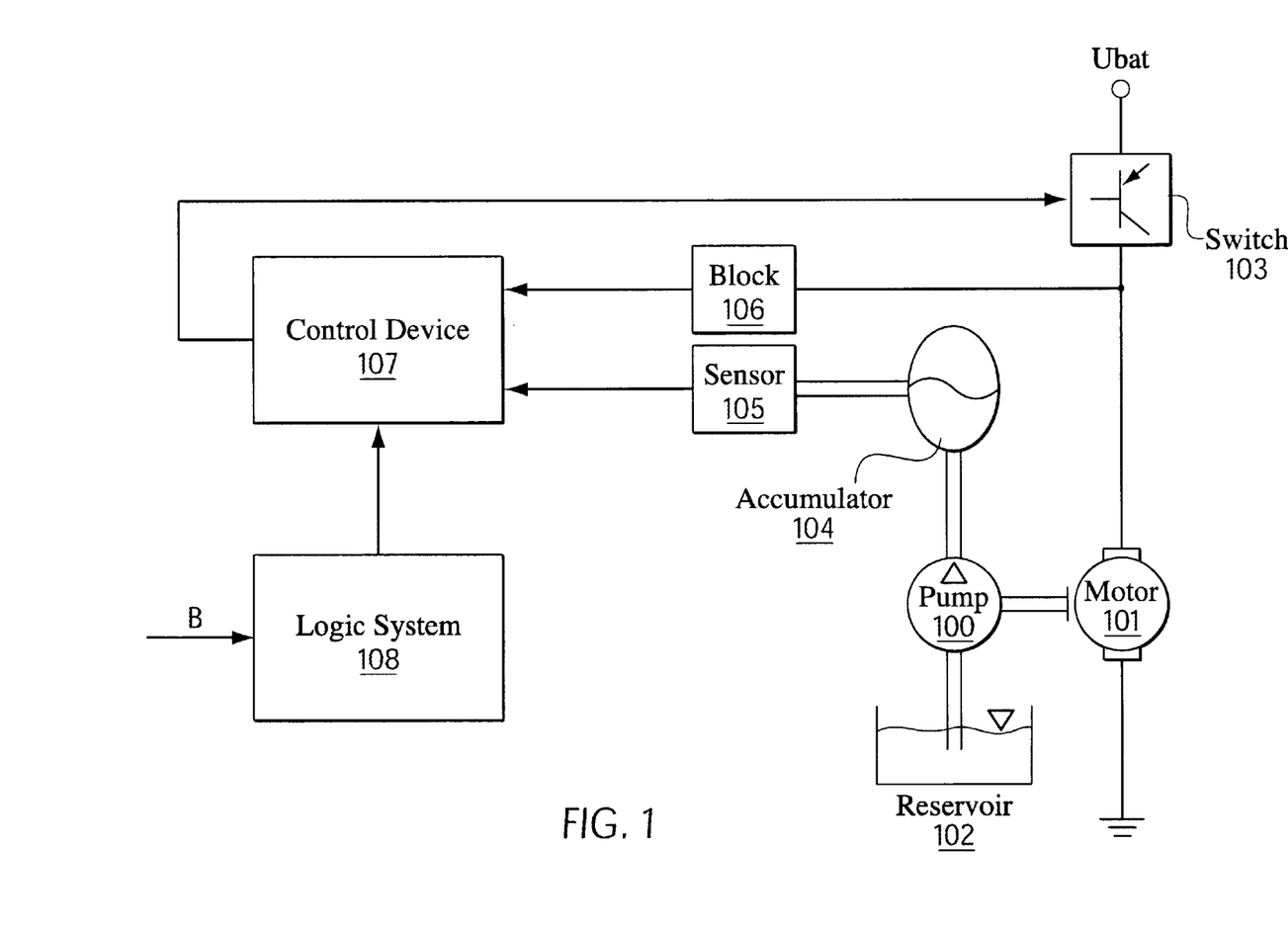
FIG. 1 shows a preferred exemplary embodiment with a portion of a braking system, in the form of a block diagram.

The method according to the present invention is described with reference to an example in which the pressure or pressure gradient is obtained from a pressure accumulator, and a pump that feeds the pressure accumulator is activated. In addition to use of the accumulator pressure gradient, however, any other pressure or pressure gradient occurring in the braking system can also be used. FIG. 1, by way of example, depicts an apparatus in the form of a block diagram, showing a pump 100 for delivering a pressure medium from a reservoir container 102 into a pressure accumulator 104. The pump is driven by a motor 101, which is connected to or disconnected from supply voltage Ubat via a switching arrangement 103. The pressure of pressure accumulator 104 is acquired by way of a sensor, and the datum representing the pressure value is forwarded. This takes place in block 105. In addition to sensor-based acquisition of the pressure value, there also exists the possibility of estimating the particular relevant value of the pressure or the pressure gradient by modeling. By way of block 106, the voltage drop at pump motor 101 is acquired and the datum representing the voltage value is forwarded to a control device 107. The datum representing the pressure value of accumulator 104 is also passed on by block 105 to the same control device 107.

In addition to the use of analog variables for the activation signal U(t), the generator voltage Ugen, the pressure P or the pressure gradient Pg, it is also necessary to read in and prepare these variables for use in a computer program. The data contained in these variables are thus critical for the utilization thereof according to the present invention, and can be used in either analog or digital fashion.

In addition, control device 107 receives input data from a possible higher-level logic system 108, e.g. an ABS/ASR/FDR logic system. This in turn receives, among its input variables, the driver's braking input B. Control device 107 in turn is connected to switching arrangement 103, and thereby controls the switching of supply voltage Ubat to pump motor 101. From the pressure value acquired by block 105 and processed further, the necessary pressure gradient is created in control device 107. In a different embodiment it is also possible to provide for the respective pressure gradient to be created in block 105 itself, and then transferred directly to control device 107. This shows clearly that the allocation of the individual functionalities to the respective blocks of the diagram as made in this exemplary embodiment is not absolutely predefined, and that a different functional division or even fusion of, for example, control device 107 and higher-level logic system 108 in a control unit is possible. In addition, the input variables that are not essential to the present invention for, e.g., higher-level logic system 108, such as wheel rotation speed signals, yaw rate signals, etc. are omitted from or not explicitly indicated in FIG. 1.

Figure 2:
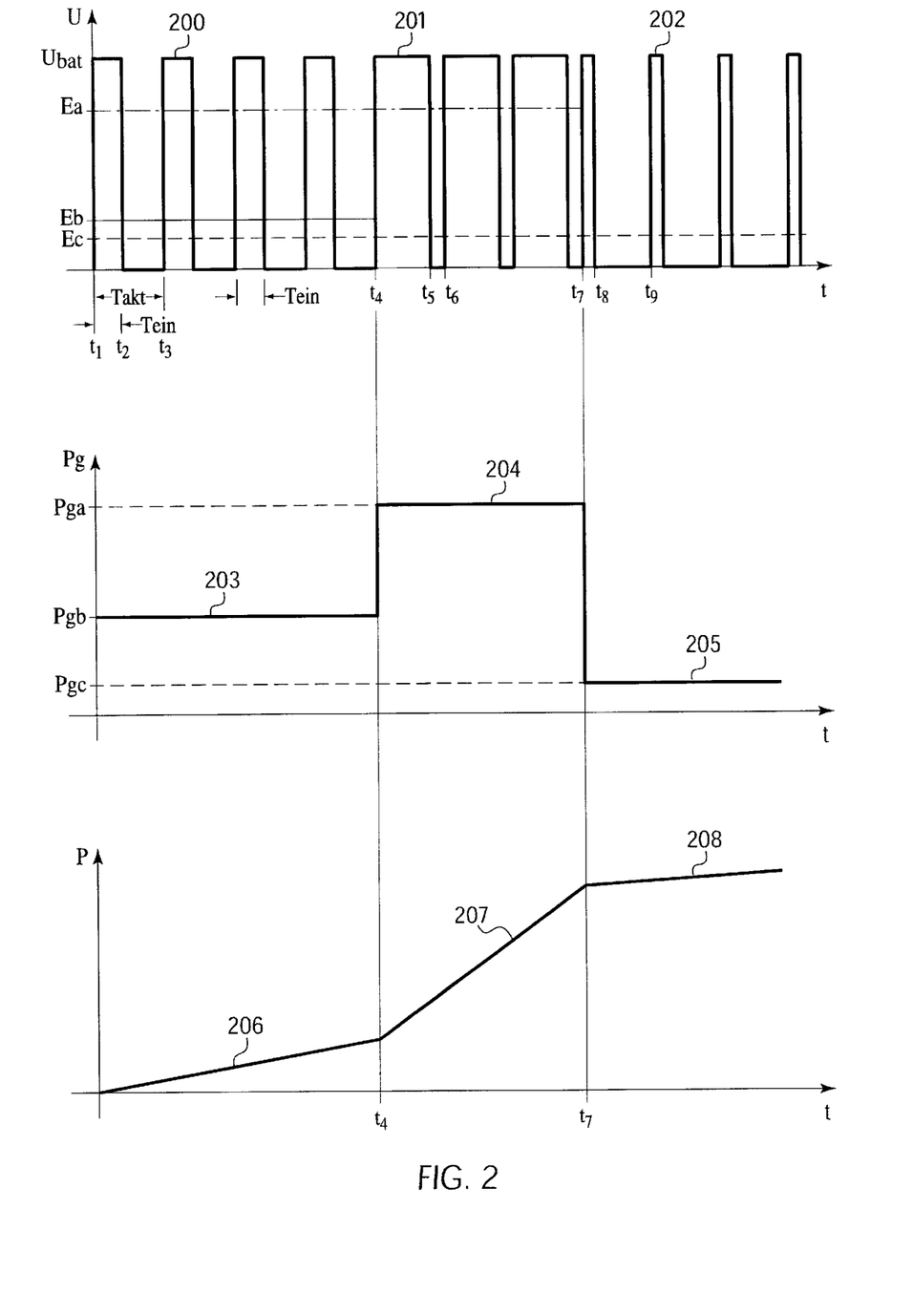
FIG. 2 depicts the correlation of the various switched-on durations Tein within one activation clock cycle TAKT and the pulse-width modulated signal U(t)=U resulting therefrom for activation of the pump motor, with the pressure P(t)=P achieved thereby and the resulting pressure gradient Pg, for the case of a pressure rise.

FIG. 2 schematically shows, for this purpose, the correlation among a clock-timed activation signal U(t) of pump motor 101—with effective values Ea, Eb, Ec of the activation signal achieved by varying the switched-on time Tein—a pressure P resulting therefrom, and resulting pressure gradients Pga, Pgb, Pgc. The change in switched-on time Tein per clock period TAKT is identical in meaning to the change in the pulse/interpulse ratio of the activation signal U(t). The activation signal U(t) is thus a function of the switched-on time Tein and the activation clock cycle duration TAKT (U(t)=f(Tein, TAKT)). Effects occurring in a real measurement protocol, such as exaggerated switching edges or delays caused, for example, by a sampling time or other dead-time characteristics, are omitted from this schematic depiction for the sake of clarity.

FIG. 2 thus depicts the fact that a pressure gradient Pga, Pgb, Pgc is associated in accumulator 104 with each effective value Ea, Eb, Ec that results from a specific switched-on time Tein within an activation clock cycle TAKT. In segment 200 of activation signal U(t) of pump motor 101, there results, from the change in switched-on time Tein and switched-off time (TAKT–Tein) within one activation clock cycle period TAKT, an effective value Eb that is expressed schematically as one possible pressure rise, depicted in segment 206 of pressure curve P, in the pressure accumulator. The resulting pressure gradient, once again depicted schematically, is labeled Pgb in segment 203 of pressure gradient curve Pg. If the switched-on time Tein then changes in segment 201 of activation signal U(t) from the previous t2–t1 to t5–t4, while clock cycle period TAKT remains unchanged (e.g. t3–t1=t6–t4), the curve for accumulator pressure P then also changes perceptibly in segment 207; in this case, the resulting pressure increases. The accumulator pressure gradient Pg thus also rises perceptibly in segment 204, from Pgb to Pga. In the subsequent segment 202, on the other-hand, a shortening of the switched-on period Tein from t5–t4 to t8–t7, once again with the same clock cycle period TAKT (t9–t7=t3–t1=t6–t4), appreciably decreases the pressure gradient Pgc that is achieved (Pgc, segment 205). The result is a visibly flatter curve in segment 208 of pressure P.

The depiction contained in FIG. 2 illustrates the aforesaid correlation between the activation signal U(t) and the pressure gradient Pg for a pressure rise, such as is present when pressure medium is delivered into an accumulator with, for example, a pump, for example in the case of an electrohydraulic braking system having an accumulator pump. In addition, the method, apparatus, and especially the correlation in FIG. 2 are to be understood analogously for a pressure drop, i.e. negative pressure gradients. This situation with a decreasing pressure curve occurs, for example, in the case of a return flow pump in a hydraulic braking system, e.g. when the pressure medium is being delivered out of a line connected to the wheel brakes or out of a pressure accumulator.

The method and apparatus for creating and/or adapting the activation signal of the arrangement for delivering the pressure medium as a function of a pressure gradient variable can also be used in combination with known methods in which the generator voltage Ugen of the pump motor is utilized to create and/or adapt the activation signal.

Figure 3A:
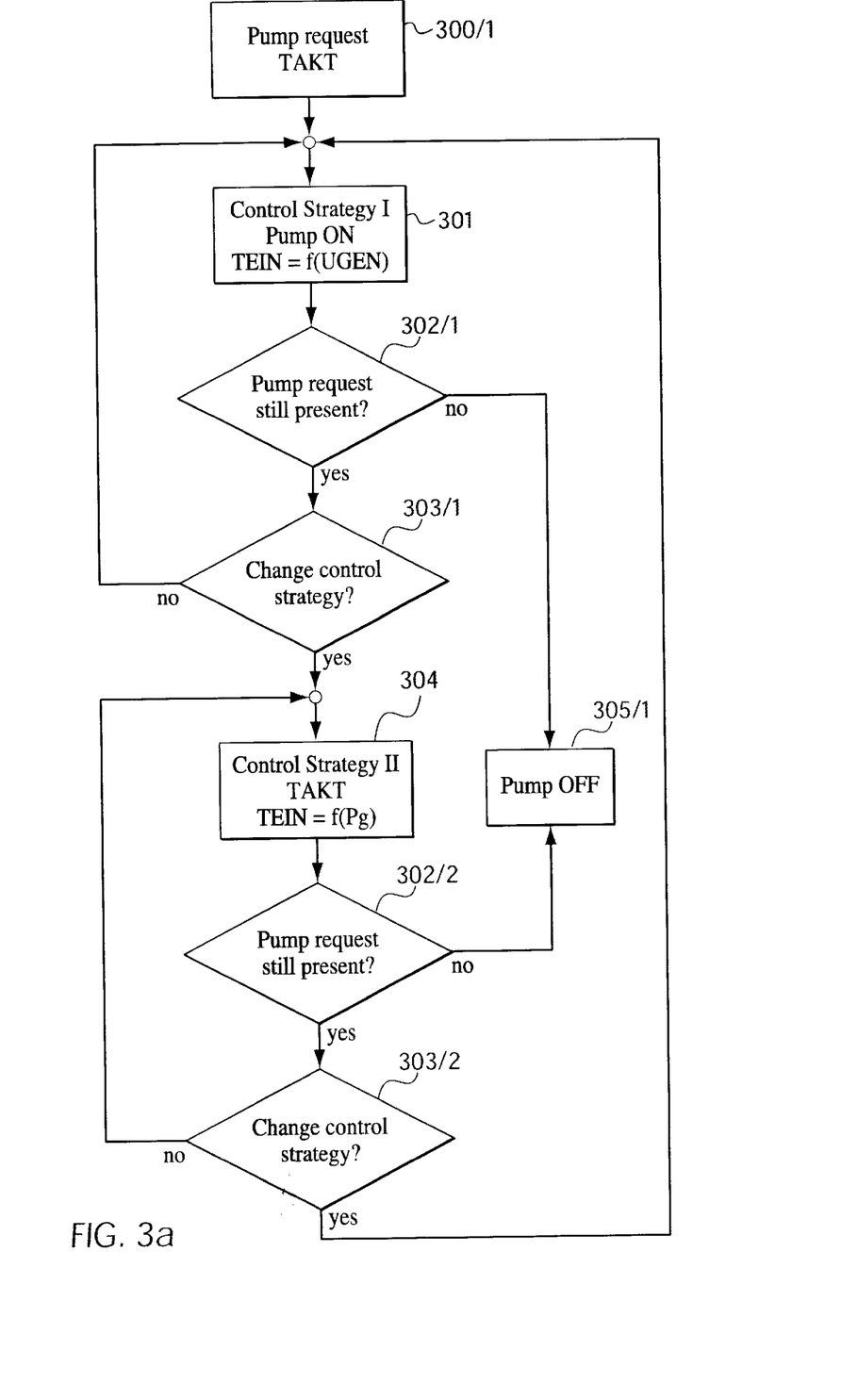
FIG. 3a is a first flow diagram depicting a pressure gradient method, alternatively to or in combination with the determination of the switched-on time Tein from the generator voltage of the pump motor operating at zero load.

When alternative use is made of creation of the switched-on time Tein within a clock cycle TAKT, on the one hand as a function of the generator voltage Ugen (control strategy I) and on the other hand as a function of the pressure gradient Pg (control strategy II), there occurs in FIG. 3a, under certain conditions, a changeover from the one particular control strategy being used to the other. The starting time for selection of the method is a pump request with definition of the activation clock cycle TAKT to be used (300/1). At first, for example, control strategy I is used; in block 301 the pump is switched on and the switched-on time Tein is created as a function of the generator voltage of pump motor 101 (Tein=f(Ugen)=Tein(Ugen)). In block 302/1, a check is then made as to whether the pump request is still present. If not, the pump is switched off (305/1). If the pump request still exists, block 303/1 checks at least one condition on the basis of which a change in control strategy is to be performed.

One such condition may be, for example, an insufficient delivery capacity, for example at low temperatures. An insufficient pressure gradient can also be the trigger for changing the control strategy; this is checked, for example, by way of a pressure gradient threshold (e.g. minimum pressure gradient threshold). Also possible here is the use of threshold values for the generator voltage or the pressure, a changeover in control strategy occurring if the value is exceeded or fallen short of.

If there exists, based on the query in block 303/1, no reason for a change in control strategy, the switched-on time Tein or the pulse/interpulse ratio of the activation signal of pump 100 or of pump motor 101 continues to be created as a function of the generator voltage. If such a change does need to be made, however, a transition is then made (in block 304) to control strategy II, switched-on time Tein within a clock cycle period TAKT being determined as a function of a pressure gradient variable. It is also possible, in the case of such a changeover, to redefined the activation clock cycle TAKT.

Since what is important, as shown in FIG. 2, for attaining the effective values is the ratio between switched-on time Tein and switched-off time (TAKT−Tein), a definable variation in the activation clock cycle period TAKT (by analogy with the change in switched-on time Tein) is also advantageous, and in certain circumstances may even be more advisable.

The dependency of the creation and/or adaptation of the activation signal U or the activation clock cycle TAKT, and the switched-on time Tein, on a pressure gradient variable Pg can be realized in different ways:

Stipulating the respective pressure gradient variable as a command variable (e.g. Pgw) in a control loop and creating and/or adapting the activation signal U(t)=f(TAKT, Tein) using an actuator.

Inputting the respective pressure gradient variable Pg into a characteristic curve or characteristics diagram and outputting the activation signal U (U(t)=f(TAKT, Tein)) from that characteristic curve or characteristics diagram.

Using threshold values of the pressure gradient variable and creating and/or adapting the activation signal U (U(t)= f(TAKT, Tein)) by comparing the respective ascertained pressure gradient variable Pg to those threshold values.

Associating at least one pressure gradient variable Pg with a respective segment of the activation signal U(t) (e.g. 200, 201, 202) and creating and/or adapting at least one new activation signal (e.g. 201)—which follows the original respectively associated segment of the activation signal (e.g. 200) or follows the original activation signal (U(t)=f(TAKT, Tein)—or one new switched-on duration Tein within an activation clock cycle TAKT, by simple further calculation, e.g. by addition or subtraction of time steps to or from the switched-on duration Tein, by multiplication or division, or by other operations or functions.

In block 302/2, as in block 302/1, a check is made as to whether the pump request indicated in block 300/1 is still present. If not, once again execution passes to block 305/1 and pump 100 is switched off. If the pump request is still present, however, here again the query is made in block 303/2 as to changing the control strategy. If such is necessary, execution returns to control strategy I in block 301. If the control strategy is not to be changed, the switched-on time Tein continues to be determined as a function of the pressure gradient (Tein=f(Pg)=Tein(Pg)).

Figure 3B:
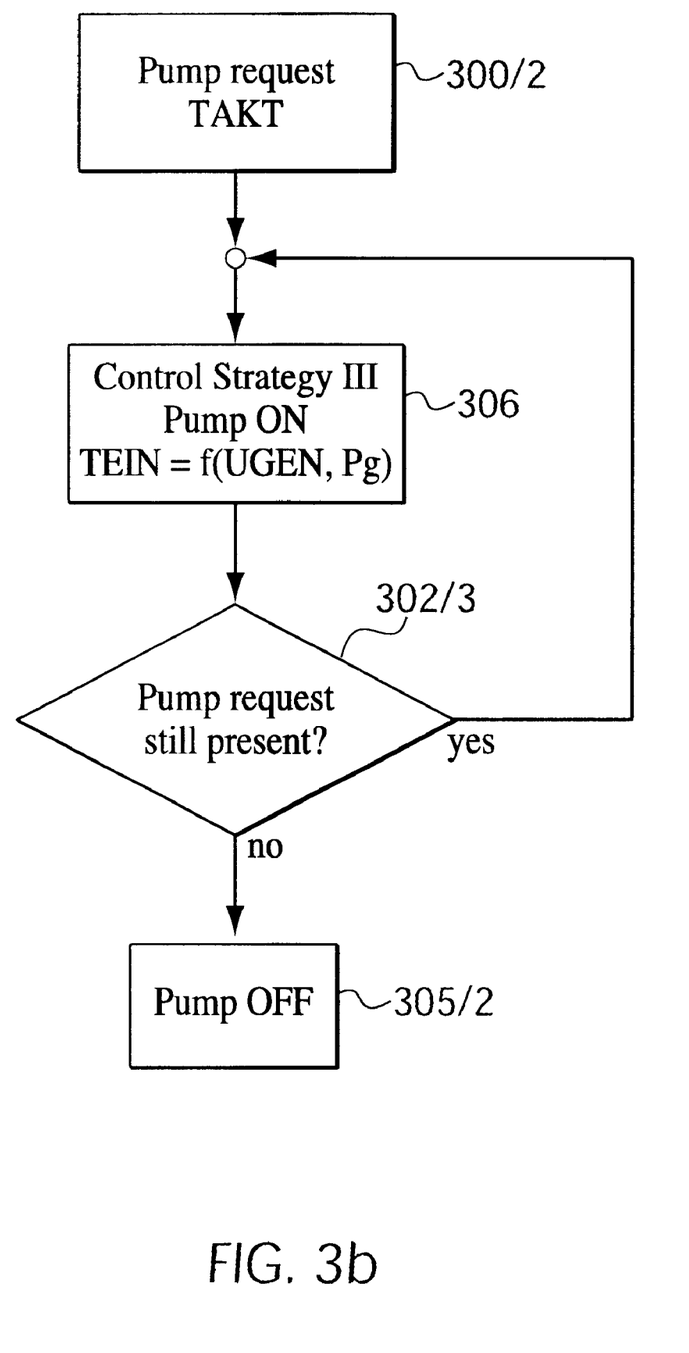
FIG. 3b is a second flow diagram depicting a pressure gradient method, alternatively to or in combination with the determination of the switched-on time Tein from the generator voltage of the pump motor operating at zero load.

FIG. 3b depicts the activation of pump 100 or pump motor 101 using a control strategy III. Instead of the alternative use of control strategies I and II in FIG. 3a, here the activation signal is created and/or modified as a function of the generator voltage and the pressure gradient. Again starting from a pump request 300/2 with predefinable activation clock cycle TAKT, the switched-on time Tein is determined in block 306 as a function of both variables (Tein=f(Ugen, Pg)). In a preferred instance this is done, for example, according to the formula:

$$Tein = A \cdot Tein(Ugen) + B \cdot Tein(Pg) \qquad (1)$$

where A, B ∈ {0 . . . 1} and A+B=1

Other operations involving the two switched-on times Tein(Ugen) and Tein(Pg) are also conceivable. Direct determination of the switched-on time Tein from the generator voltage Ugen and the pressure gradient Pg—i.e. Tein(Ugen, Pg)=f(Ugen,Pg)—is also advantageous in this context. Proceeding from control strategy III in block 306, a check is then made in block 302/3 as to whether the pump request is still present. If so, the pump continues to be activated using control strategy III. If the pump request has meanwhile ceased to exist, execution passes to block 305/2 and the pump is switched off.

In a further embodiment, pump 100 or pump motor 101 is activated exclusively with an activation signal U(t) that is created and/or modified as a function of a pressure gradient variable (U(t)=f(Pg)). Here again, the switched-on time Tein and/or the activation clock cycle period TAKT can be created and/or adapted as a function of the pressure gradient variable Pg (U(t)=f(Tein, TAKT)).

In determining the switched-on time Tein as a function of the pressure gradient, the latter is used, for example, in a control loop. In that context, a reference pressure gradient is defined as command variable and compared, using a comparator, to an actual value for the pressure gradient; the result is conveyed to a control element; and from the output of that control element the manipulated variable for activating pump motor 101 is created using an adjusting device.

Figure 4:
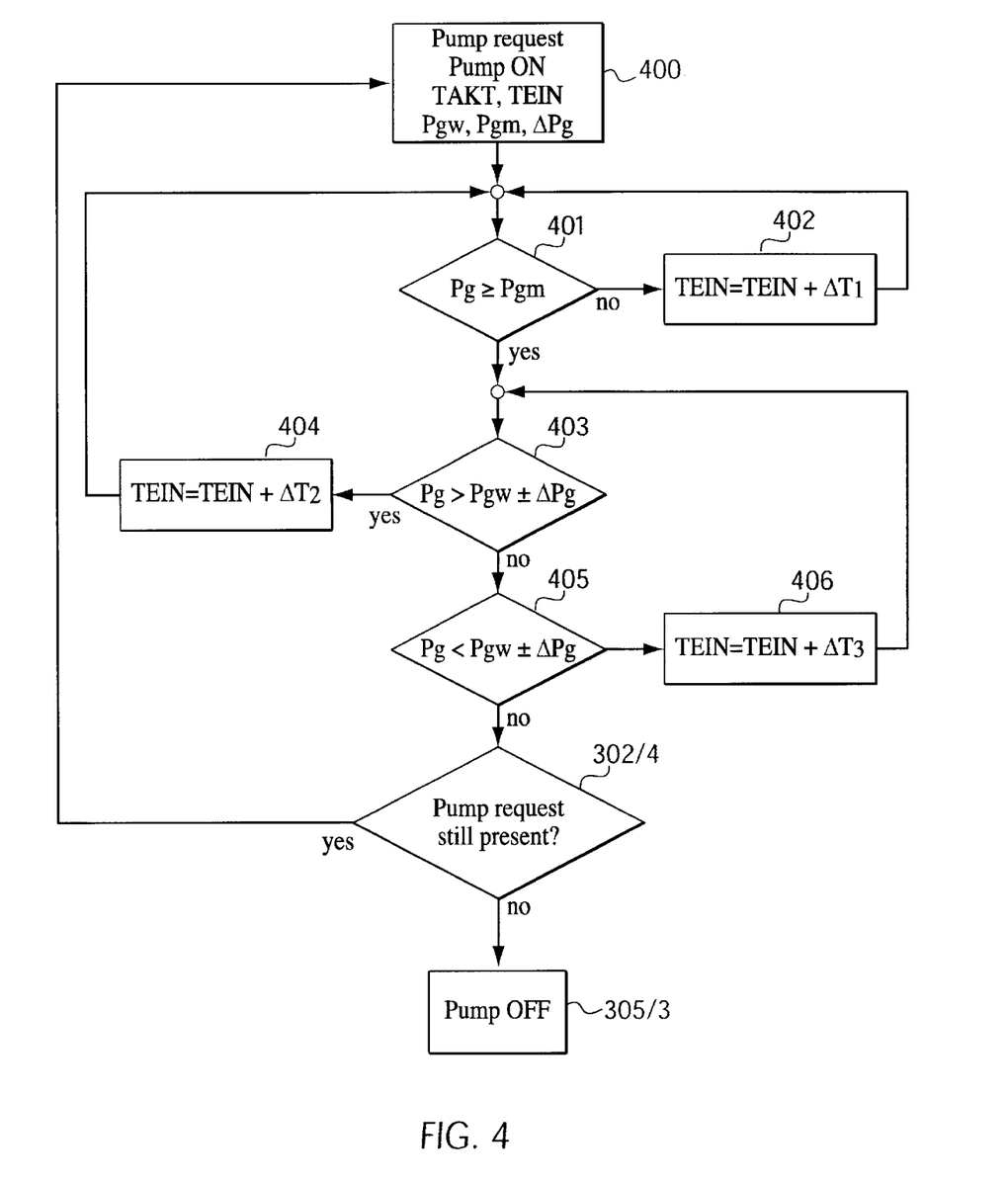
FIG. 4 illustrates a specific method for tracking a desired pressure gradient within a predefinable tolerance, taking into account a minimum pressure gradient.

FIG. 4 shows a flow chart for a variant of an exemplary embodiment for a method for activating pump 100. The starting point is once again a pump request in block 400. The pump is switched on (Pump ON), a variable clock cycle TAKT or a variable switched-in time Tein within that clock cycle being definable. Also definable are a desired pressure gradient Pgw, a minimum pressure rise or pressure drop Pgm, and a certain tolerance ΔPg. The case of a pressure rise in the accumulator will be considered below. A pressure drop can be treated in analogous fashion thereto. In the case of the desired pressure rise, first of all a check is made in block 401 as to whether a minimum pressure rise has been reached. If the measured or estimated actual value of the pressure gradient variable Pg is less than a definable minimum pressure gradient Pgm the switched-on time Tein is raised by ΔT1 per clock cycle, in this case specifically in block 402. This occurs until the predefinable minimum pressure gradient Pgm is reached. Once the minimum pressure rise has been reached, an attempt is made to track a predefinable variable desired pressure gradient Pgw within a specific tolerance Δpg. For this purpose, first of all a check is made in block 403 as to whether the actual value of the pressure gradient Pg is greater than the predefinable desired pressure gradient Pgw. The desired pressure gradient Pgw can be ascertained or predefined by laboratory experiments, measurements, estimated values, or empirical values, for example from a characteristics diagram. The desired pressure gradient Pgw can also be ascertained from at least one measured or estimated actual pressure gradient Pg. If, in 403, the actual pressure gradient Pg is located above the tolerance band (Pgw±ΔPg) of the desired pressure gradient Pgw, then in block 404 the switched-on time Tein per clock period is shortened by ΔT2, thus lowering the actual pressure gradient Pg. This takes place until the pressure gradient Pg, taking into account a certain tolerance ΔPg (which can also be zero), no longer exceeds the desired pressure gradient Pgw, but is nevertheless above the minimum pressure rise Pgm. If this condition is met, a check is made in 405 as to whether the actual pressure gradient Pg is located below the tolerance band (Pgw±ΔPg). If the actual pressure gradient is less than the predefinable desired pressure gradient Pgw, then in block 406 the switched-on time Tein is raised again by ΔT3 in each case. In this exemplary embodiment, the increase or decrease in the switched-on time Tein occurs by adding or subtracting time steps. These time steps ΔT1, ΔT2, ΔT3 can be identical, or depending on queries 401, 403, 405 can be differently adapted in each of blocks 402, 404, 406. The use of two identical values and one different value for ΔT1, ΔT2, ΔT3 can also be advantageous, depending on the situation. Instead of an addition or subtraction of these time steps ΔT1, ΔT2, ΔT3, a different operation, for example by multiplication, division, or the use of a characteristic curve or a characteristic curve, or other operations, are also advantageous and conceivable. If the queries in block 403 and block 405 are respectively answered with No, the actual pressure gradient Pg is located within the desired tolerance band (Pgw±ΔPg). A check is then made in block 302/4 as to whether the pump request from block 400 is still present. If so, the control loop is cycled through again. Otherwise the pump is switched off in block 305/3. In this exemplary embodiment, a desired predefinable pressure gradient value Pgw is reached, as a result of which the time within which a certain pressure level is to be reached can also be predefined. By selecting the predefinable tolerance ΔPg, it is possible to establish the accuracy, i.e. the width of the tolerance band (Pgw±ΔPg).

The embodiment disclosed in FIG. 4 deals with a desired pressure rise Pgw taking into account a minimum pressure gradient Pgm. Also advantageous is the use of a maximum permissible pressure gradient, for example to prevent the mechanical pressure load from rising too greatly. It is moreover desirable, for example in the case of a return flow pump of a hydraulic braking system, to monitor and predefine not the pressure rise but rather the pressure drop, for example in the wheel brakes and/or in the downstream pressure accumulator. According to the present invention, this can be accomplished by analogy with the exemplary embodiments that have been disclosed.

Figure 5:
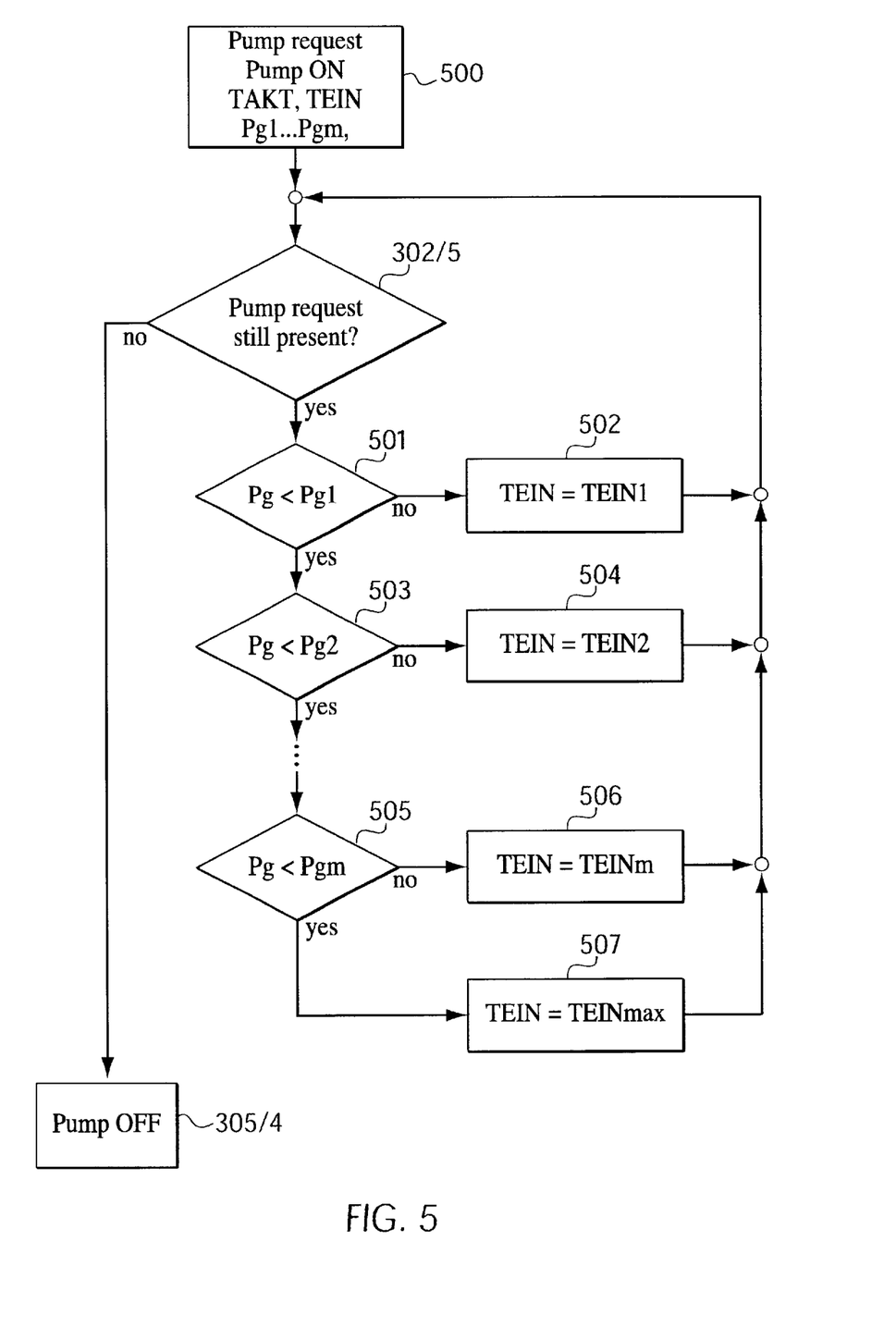
FIG. 5 shows a further pressure gradient method in which different switched-on durations within one clock cycle interval are defined in demand-based fashion on the basis of various gradient threshold values.

In a further exemplary embodiment for use of the pressure gradient to create and/or adapt the activation signal of the arrangement for delivering the pressure medium, in FIG. 5 the pressure gradient is predefined in demand-based fashion. The desired pressure curve is then set as a function of the situation. For this purpose, execution once again proceeds (in block 500) from a pump request, whereupon pump 100 is switched on (PUMP ON). This is done once again by predefining a clock cycle TAKT and a switched-on time Tein that is predefinable within that clock cycle. Also now indicated are various pressure gradient threshold values Pg1, Pg2, . . . Pgm, with which switched-on times Tein1, Tein2, . . . Teinm will respectively be associated in due course. In block 501 a check is made as to whether the actual gradient variable Pg has at least reached a first gradient threshold Pg1. If the actual value is at least as great as this first threshold, a specific switched-on time Tein1 is set in block 502; if Pg1 is, for example, a maximum permissible pressure gradient, this time can be less than the switched-on time Tein previously set in 500. In other words, when a very large pressure gradient is achieved, the switched-on time Tein can be reduced and thus the pressure gradient can be decreased in demand-based fashion. Similarly, in block 503 a check is made for a second threshold Pg2. Thus if the actual pressure gradient variable Pg is at least at the level of Pg2 but below Pg1, then in block 504 a second switched-on time Tein2 is set. Subsequently, this querying of the pressure gradient thresholds results in selection of a switched-on time Tein that is set in demand-based fashion. For example, if the actual pressure gradient Pg falls below the predefinable minimum pressure gradient Pgm, then a maximum switched-on time Teinmax can immediately be predefined in block 507, up to the point of full activation at which Tein=TAKT. Otherwise the switched-on time Tein is, for example, adapted in block 506 as a function of the threshold value. Once the threshold value queries have been cycled through, a check is made in each case in block 302/5 as to whether the pump request from block 500 is still present. If so, another threshold value query starts. If the pump request is no longer present, the pump is switched off in block 305/4.

In addition to the use of the switched-on time Tein or activation clock cycle period TAKT and their dependency on the pressure gradient variable Pg, as depicted in FIG. 2, to create and/or adapt the activation signal U(t), it is also possible to use a predefinable variation in the supply voltage Ubat, up to the point of a continuous supply voltage curve Ubat(t), as a function of the pressure gradient variable Pg, since the result thereof is also to modify or adapt the effective value of the activation signal U(t) and thus of the pressure gradient Pg. Thus, for U(t)=f(TAKT, Tein, Ubat(t)), all three variables TAKT, Tein, and Ubat can be varied as a function of the pressure gradient variable Pg, and can thus be used individually or in combination to create and/or adapt the activation signal U.

The pressure gradient variable used in the exemplary embodiments is a time gradient that can, however, appropriately be obtained at various locations in the braking system. Preferred locations are existing pressure accumulators in conjunction with upstream or downstream arrangements for delivering the pressure medium, in particular pumps. Supply or discharge lines for the pressure medium, for example, are nevertheless also useful as locations for ascertaining the pressure gradient variable. When multiple different locations are used to ascertain the pressure gradient variable, a pressure gradient variable, constituting a local gradient, is also useful in substitutive or complementary fashion, so that an arangement for delivering the pressure medium, in particular a pump, can be activated, for example, as a function of a pressure gradient variable ascertained locally upstream or downstream from it in the braking system. In the next step, this activation can thus also be accomplished as a function of the pressure profile over a segment of the braking system.

What is claimed is:

1. A method for activating an arrangement including a pump for delivering a pressure medium in a braking system, the method comprising the steps of:

ascertaining a pressure gradient variable representing an actual value of a pressure gradient of the pressure medium; and predefining a first condition as a first dependency mode such that an activation signal is generated as a function of the ascertained pressure gradient variable wherein the activation signal is dependent on the first condition.

2. The method according to claim 1, further comprising the step of:

predefining a second condition as a second dependency mode such that the activation signal is generated as a function of a voltage variable and associated with the arrangement for delivering the pressure medium.

3. The method according to claim 1, wherein the generation of the activation signal is one of:

simultaneously dependent on the first condition and a second condition, the second condition being predefined as a second dependency mode so that the activation signal is generated as a function of a voltage variable associated with a drive system of the arrangement for delivering the pressure medium, alternatively dependent on the first condition and the second condition, and exclusively dependent on the first condition and the second condition.

4. The method according to claim 2, wherein the dependency mode and the second dependency mode correspond to different dependency modes, wherein the different dependency modes are usable as conditions for the generation of the activation signal, the use of the different dependency modes to generate the activation signal further includes at least one of the following steps:

stipulating the pressure gradient variable and the voltage variable as command variables in a control loop and generating the activation signal using an actuator, inputting the pressure gradient variable and the voltage variable into a characteristic curve or a characteristics diagram and outputting the activation signal from the characteristic curve or the characteristics diagram, providing threshold values of the pressure gradient variable and the voltage variable and generating the activation signal by comparing the pressure gradient variable and the voltage variable to the threshold values, or associating at least one of the pressure gradient variables and the voltage variables with the activation signal and generating at least one new activation signal which follows the activation signal associated with at least one of the pressure gradient variables and the voltage variables.

5. The method according to claim 4, further comprising the steps of:

predefining different pressure gradients as the threshold values, wherein the step of predefining different pressure gradients includes the steps of predefining at least a smallest pressure gradient and a largest pressure gradient corresponding to values of the threshold values.

6. The method according to claim 1, further comprising the steps of:

ascertaining a desired pressure gradient in the pressure medium; and generating the activation signal such that the desired pressure gradient in the pressure medium is set within a preselected tolerance.

7. The method according to claim 3, further comprising the step of:

generating a switched-on time within an activation clock cycle of the activation signal in order to generate the activation signal.

8. The method according to claim 7, wherein the generation of the activation signal is accomplished by generating the switched-on time in simultaneous dependence on the first condition and the second condition, according to the following equations:

$$Tein = A \cdot Tein(Ugen) + B \cdot Tein(Pg);$$

wherein:

$A, B \in \{0 \ldots 1\}$ and $A+B=1$,

Tein corresponds to the switched-on time within the activation clock cycle of the activation signal, Ugen corresponds to the voltage variable of the drive system of the arrangement for delivering the pressure medium, and Pg corresponds to the ascertained pressure gradient variable of the pressure medium.

9. The method according to claim 1, wherein the step of ascertaining the pressure gradient variable includes the step of ascertaining the pressure gradient variable from a pressure accumulator in the braking system.

10. An apparatus for generating an activation signal for activating an arrangement including a pump for delivering a pressure medium in a braving system, the activation signal being dependent on a first condition, the apparatus comprising:

a control unit; and a sensor arrangement associated with the control unit, the control unit performing the steps of:

ascertaining a pressure gradient variable representing an actual value of a pressure gradient of the pressure medium, predefining the first condition as a first dependency mode such that the activation signal is generated as a function of the ascertained pressure gradient variable, and predefining a second condition as a second dependency mode such that the activation signal is generated as a function of a voltage variable associated with the arrangement for delivering the pressure medium, wherein the generation of the activation signal is one of:

simultaneously dependent on the first condition and the second condition, alternatively dependent on the first condition and the second condition, and exclusively dependent on the first condition and the second.

* * * * *

UNITED STATES PATENT AND TRADEMARK OFFICE
CERTIFICATE OF CORRECTION

PATENT NO. : 6,389,349 B1  
DATED : May 14, 2002  
INVENTOR(S) : Hachtel

It is certified that error appears in the above-identified patent and that said Letters Patent is hereby corrected as shown below:

Column 10,
Line 41, change "braving" to -- braking --.

Signed and Sealed this

Eighth Day of July, 2003

JAMES E. ROGAN
*Director of the United States Patent and Trademark Office*